Feb. 18, 1969 J. L. WALLACE, JR 3,428,949
DISTRIBUTOR SYSTEM FOR MONITORING POSITION
AND STATUS OF A NUMBER OF POINTS
Filed Oct. 22, 1965 Sheet 1 of 2
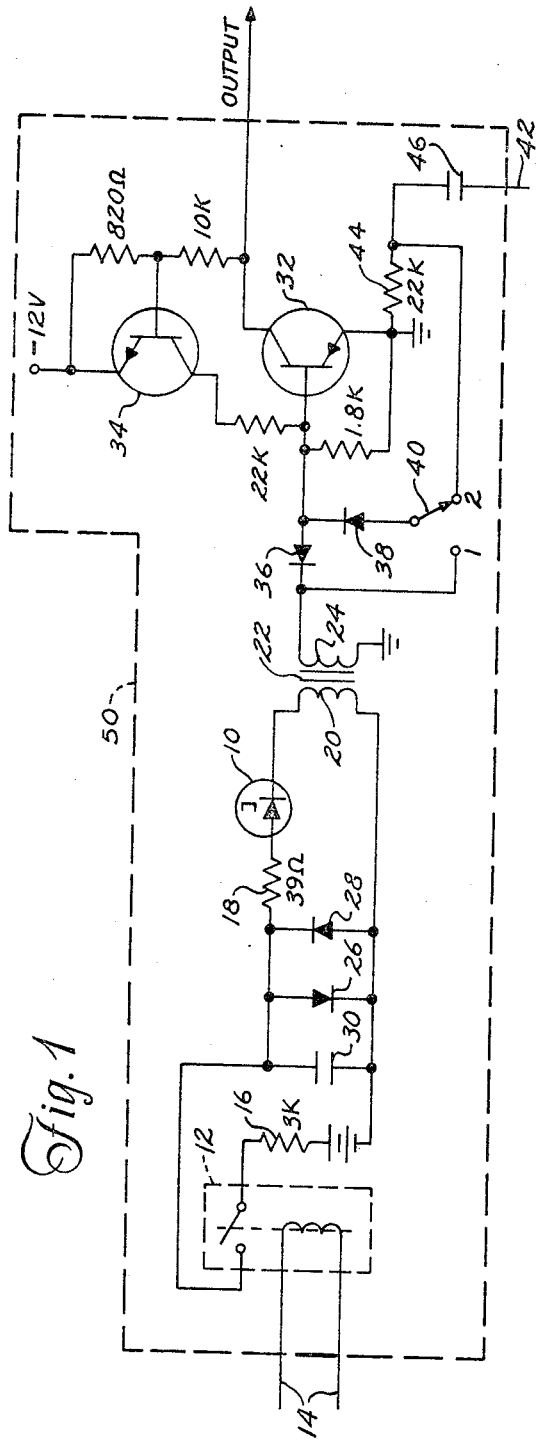
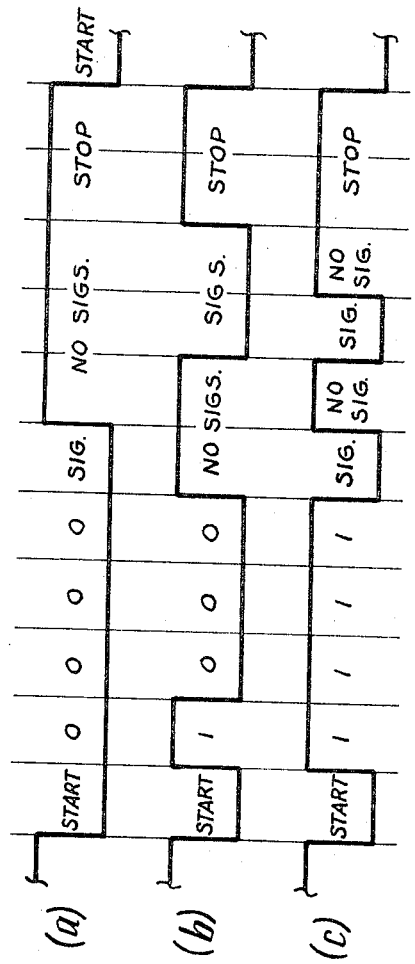
INVENTOR
J. LIGHTSEY WALLACE, JR.
BY Tipton D. Jennings
ATTORNEY United States Patent Office 3,428,949
Patented Feb. 18, 1969

3,428,949
DISTRIBUTOR SYSTEM FOR MONITORING POSITION AND STATUS OF A NUMBER OF POINTS
Jacob Lightsey Wallace, Jr., Springfield, Va., assignor to The Susquehanna Corporation, a corporation of Delaware
Filed Oct. 22, 1965, Ser. No. 502,086
U.S. Cl. 340—147                    6 Claims
Int. Cl. H04q 3/50, 5/16

ABSTRACT OF THE DISCLOSURE

An encoder for a data collecting or monitoring system is described. The distributor in the system scans two groups of AND gates. The first group provides the location of the remote points being monitored on that scan. The second group provides the status information of the remote monitored points. Accordingly, the generated output pulse train contains two types of pulse-coded information, one relating to position and the other relating to status or condition. A regenerative repeater is connected at the encoder output to provide undistorted or unmutilated output signals.

---

The present invention relates to a communication system and in particular to an encoding system for data collection.

The communication system is directed to an encoder which generates and transmits information in the form of data pulse trains. The encoder functions as a data collector by monitoring the status of various selected points. The pulse arrangement or code in each pulse train is determined by both the state of the input signals applied to the encoder from the selected points and the location of such points. Transfer circuits are used to isolate or buffer the input signals from the encoder logic.

In encoding systems of this general type, storage registers are often provided in which the received information or its equivalent is stored until readout. Provision of this register prevents during readout any change in the input information which would cause garbled or mutilated output signals to result. In the present encoder the need for this storage register function is eliminated by the incorporation of a regenerative repeater at the output of the encoder which reshapes the output signals regardless of distortion or mutilation.

It is an object of the present invention to provide an improved encoder whose generated pulse trains contain more than one type of coded information. Another object of this invention is to provide an improved encoder whose pulse train contains data both as to the status of remote monitored points as well as the location of such points.

Another object of this invention is to provide an improved encoder which collects data from a plurality of remote points and generates a pulse train in which such data is included in pulse code format and which train also includes information as to the location of such remote points in pulse code format. A still further object is to provide such an encoder having a substantial reduction in the equipment needed and whose output signal is an undistorted and unmutilated form.

Other objects and advantages will become apparent from a reading of the following specification in conjunction with the accompanying drawings, in which:

FIGURE 1 is a schematic of the transfer circuit utilizing the tunnel diode, in combination with a controllable output circuit;

FIGURE 3 shows representative samples of generated codes.

Figure 2:
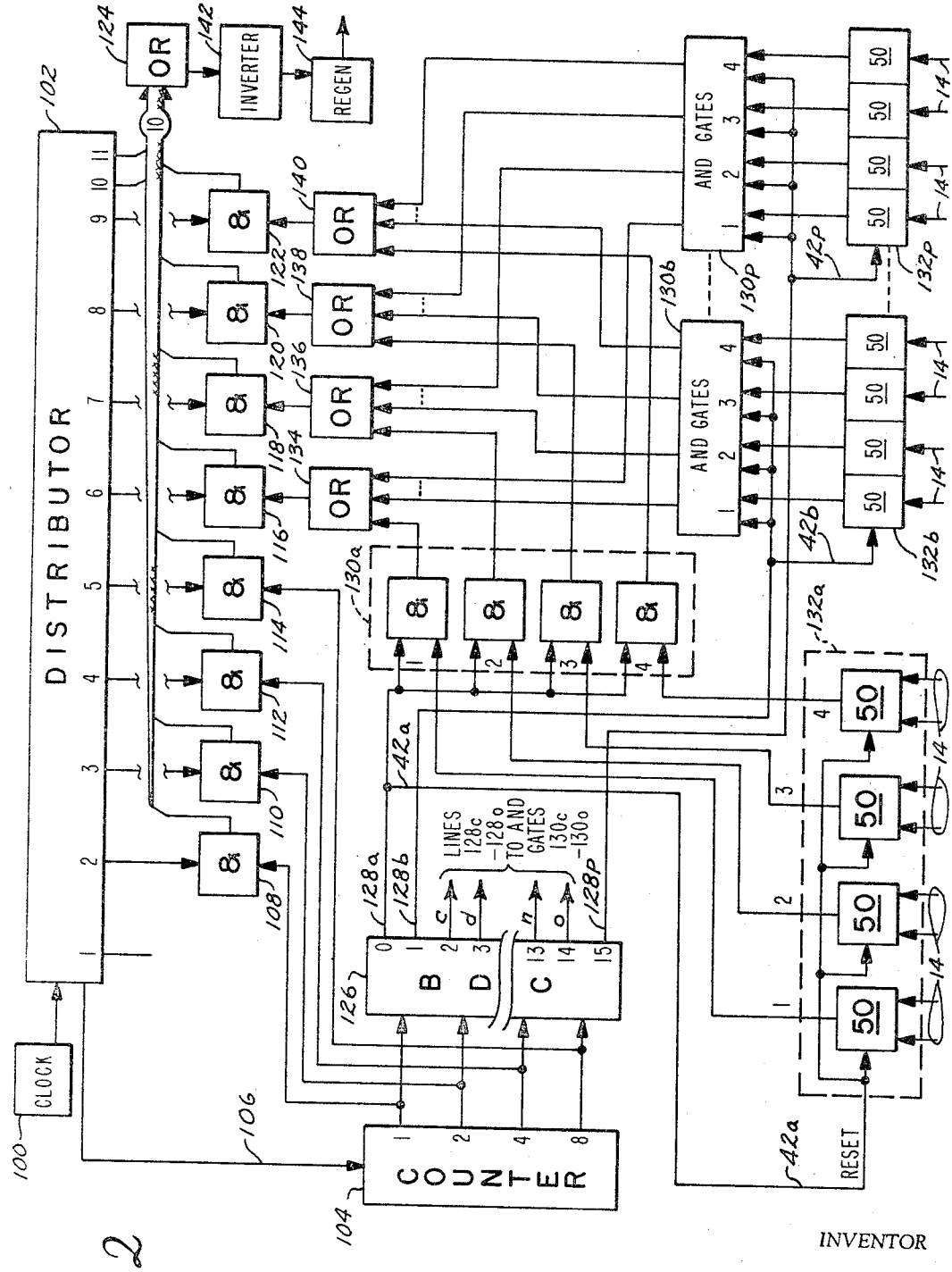
FIGURE 2 shows an encoding system in which the device of FIGURE 1 is used.

In FIGURE 1, the preferred embodiment of the transfer circuit is shown utilizing a tunnel diode 10 which is responsive, by example, to the application of a DC voltage. The voltage is applied in response to actuation of relay 12 caused by the application of suitable energizing current on input leads 14. The positive supply is here selected to be 48 volts in series with a 3000 ohm resistor 16 which will permit approximately 15 ma. of current to flow in circuit after the closing of the relay contact.

Connected in series with the tunnel diode 10 is a small load resistor 18 which aids in establishing the external operating potential or load line of the tunnel diode. Also connected in series with tunnel diode 10 is the primary 20 of a step-up transformer 22. Transformer 22 is here chosen to be a high-pass device so that no output occurs for a slow-rising transient. Coupled to the primary of transformer 22 is the secondary 24. Connected across the circuit are diodes 26 and 28 of opposite polarities for limiting the maximum current which can flow through the tunnel diode 10 and which also limit the maximum voltage at the resistor 18 and diode 10 to ±0.8 volt. Capacitor 30 in combination with resistor 16 functions as an integrator which will remove transients and noise generated by the input relay 12.

During operation of this part of FIGURE 1, input current on line 14 causes relay 12 to energize thereby closing its contact. Because of the lumped and distributed constants, the current does not rise sharply to the 15 ma. level in the tunnel diode circuit, but instead, begins to approach this current level exponentially. Transformer 22 is, as stated previously, a high-pass device and this relatively slow current rise does not cause any transforming action. Assuming that the peak tunneling current of tunnel diode 10 is on the order of 10 ma., then when this threshold level is reached, the tunnel diode substantially instantaneously changes from its low-voltage to its high-voltage state. This change occurs in about four nanoseconds. This abrupt voltage change appears to the primary 20 of transformer 22 as a high-frequency component and a large, negative, current spike is induced in the secondary 24. Capacitor 30 presents essentially a short to the high-frequency transient thereby allowing maximum signal voltage to be present at the primary 20.

When the input current on line 14 falls to the level which permits relay 12 to de-energize, its contact opens and the positive supply 48 is removed from the circuit. The current in the tunnel diode circuit decays exponentially, again at a rate which does not cause transformer 20 to function. When the current decays to the minimum valley current point of tunnel diode 10, which point can be considered a lower threshold, this diode abruptly switches back to its low-voltage state. This switching again consumes about four nanoseconds. An abrupt voltage drop, opposite in polarity to the first drop, appears across primary 20. Again this appears as a high-frequency component to the transformer 22 and a large, positive, current spike appears in the secondary 24.

The resistance of resistor 18 is shown as being 39 ohms and as such is sufficiently larger than the negative resistance of the tunnel diode 10 to prevent oscillation of the tunnel diode in combination with the inductance of the primary 20. It should be noted that this tunnel diode circuit can be operated by an alternating current input in place of the D.C. supply. In such case the tunnel diode 10, connected as shown, would respond to the rise and fall of the positive half-cycles but would not be affected by the negative half cycles. If the connections for tunnel diode 10 were reversed, then the tunnel diode circuit would respond to negative supplies. The high-pass characteristics of transformer 22 effectively blocks any output until the tunnel diode fires. Circuits of the type shown have operated satisfactorily with square wave and sine wave inputs exceeding a rate of 100,000 c.p.s. The upper input frequency limit of the circuit is where the rise time approaches the switching time of the tunnel diode. When that occurs transformer 22 can no longer block these inputs, and they will be induced into the output circuit. If a current source is desired in place of the voltage source, resistor 16 is relocated in parallel with capacitor 30.

Coupled to the transformer 22 is a circuit which is designed to be controlled or triggered by, yet remain electrically isolated from, the tunnel diode circuit. A complementary pair of transistors 32 and 34 are connected as a fast-acting switch. Diodes 36 and 38 are positioned to apply the triggering spikes to the base of transistor 32. A negative spike induced in the secondary 24 is applied through diode 36 to the base of transistor 32 to turn it on. The regenerative action of the pair of transistors 32 and 34 cause both of these transistors to become fully saturated immediately and the collector of transistor 32 rises sharply to ground potential.

Switch 40 is provided to permit this transistor switch to be reset by either internal or external means. For internal reset, switch 40 is placed in position one which enables the positive current spike induced in the secondary 24, when tunnel diode 10 returns to its low-voltage state, to pass through diode 38 to the base of transistor 32. This positive input causes transistor 32 to begin to turn off and, because of the regenerative effect of transistors 32 and 34, both transistors abruptly cut off. The collector of transistor 34 returns sharply to approximately the potential of the negative supply.

When switch 40 is placed in position 2, as shown, external reset is controlled by line 42. Resistor 44 and capacitor 46 form a differentiating circuit. A negative potential on line 42 permits capacitor 46 to charge. When line 42 goes to ground, a positive spike is applied through diode 38 to the base of transistor 32.

For convenience in describing the embodiment of FIGURE 2, the over-all circuit of FIGURE 1 is identified by the number 50. Input is applied by lines 14 and reset by line 42. The output of the circuit 50 is taken from the collector of transistor 32 and, in the present example, is a negative potential absent an input on lines 14. When an input signal is applied on lines 14, the output of circuit 50 goes to ground.

FIGURE 2 shows an encoding system in which the circuit 50 of FIGURE 1 is used. By example, the particular code format generated is an eight-element telegraph character in which the eight information bits are preceded by a one-element start pulse and followed by a two-element stop pulse.

A conventional pulse source such as clock 100 has its output connected to distributor 102. This distributor is a conventional eleven-state ring counter which advances in response to drive pulses from clock 100 and sequentially emits from each numbered output position a negative pulse during the time that the corresponding stage is conducting. An additional output from distributor 102 is connected by line 106 to a conventional binary counter 104.

Outputs 2 through 9 inclusive of the distributor 102 are individually connected to a first input of one of eight AND or coincidence gates 108 through 122. No output signal is taken from position number 1 in order to establish the start pulse of a telegraph character. Outputs from positions 10 and 11 form the stop pulse during the encoding procedure and the output lines from these two positions are connected directly to the input of OR gate 124.

Binary counter 104 counts in a natural binary sequence and the four output lines of binary counter 104, representing the binary counts 1–2–4–8, are individually connected to one of the group of AND gates 108, 110, 112, and 114. For example, the One output of binary counter 104 is connected to the second input of AND gate 108; the Two output is connected to AND gate 110; the Four output is connected to AND gate 112; the Eight output is connected to AND gate 114. When scanned or sampled by distributor 102, these four AND gates provide binary-coded information in which the output of AND gate 108 forms the least significant bit.

The output of counter 104 is also connected to a conventional binary-to-decimal converter 126. Converter 126 provides sixteen outputs in response to the advance of counter 104 through the counts 0 through 15, inclusive. These outputs are applied on lines 128a through 128p, respectively. When counter 104 progresses from count 0 through count 15, the output lines 128 of converter 126 become sequentially negative. At all other times, these lines are at ground.

Fifteen sets of AND gates represented by blocks 130 are each connected to an individual one of the output lines 128 and are numbered for convenience to correspond to these output lines. The internal construction of each AND gate block 130 is shown in 130A as containing four AND or coincidence gates. Each output line 128 is connected to one input of all four AND gates within the corresponding block 130. The second input to these AND gates is obtained from the units 132. As shown by unit 132a, each contains four circuits 50 described in FIGURE 1 and the output lines from these four circuits 50 are individually applied to the second input of one of the AND gates in block 130a. For convenience, like-numbered outputs of units 132 are connected to like-numbered AND gates within blocks 130. Each circuit 50 monitors the condition at some point, for example, the condition of a remotely located station or equipment. The output condition of each circuit 50 is determined by whether or not an input signal has been applied by lines 14. For example, if an alarm or fault condition is present at a monitored point, an input signal is applied on lines 14 to the monitoring circuit 50 causing its output to go from a negative potential to a ground potential condition. Therefore, the potential at each output line leading from the units 132 to the AND gates 130 reflects the condition at each monitored point.

Each generated telegraph character has eight information bits, four of which contain the binary-coded information. There remain four information bits for encoding the condition of the monitored points. Accordingly, four circuits 50 are grouped into each unit 132 and the output condition of one unit 132 is read or scanned during the encoding of each character. The units 132 are identified by the binary-coded information in the telegraph characters. For example, as seen by the drawing, unit 132a has been associated with AND gates 130a which are conditioned by the output line 128a corresponding to a count of zero. For this count of zero the output lines from binary counter 104 would all be at ground, preventing coincidence at any of the AND gates 108 through 114 when scanned by positions 2 through 5 of distributor 102. The telegraph character generated during that scan would contain the four bits 0 0 0 0, indicating that the information contained in bits 6 through 9 was obtained from the unit 132a. The recipient of the character need only know which points are monitored by the circuits within unit 132a.

As a further example, the information out of unit 132b is obtained when output line 128b is at negative potential. This corresponds to the count of one in binary counter 104. When that count is present, the output line one is at negative potential and the remaining output lines are still at ground. Only AND gate 108 is conditioned to pass a negative coincidence signal when scanned by distributor 102. The output of these gates will then appear as the binary number 1000, informing that the information bits 6 through 9 in the character reflect the output condition of unit 132b.

The remaining units 132c through 132p apply their outputs, respectively to AND gates 130c through 130p. These AND gates are sequentially conditioned by lines 128c through 128p as the count in binary counter 104 progresses. The binary coded information provided by the four AND gates 108 through 114 indicates sequentially during each scanning cycle which of the units 132c through 132p is being read. When unit 132p is read, line 128p is at negative potential conditioning the AND gates 130p. At this time counter 104 is at count fifteen. All four output lines from this counter are negative and AND gates 108 through 114 present, when scanned, the binary number 1111 indicating that bits 6 through 9 reflect the condition of unit 132p.

As previously mentioned, each line 128 is normally at ground, goes to negative potential for the duration of one character when the appropriate count in counter 104 has been attained and then returns to ground when that count passes. Each line 128 is connected to the reset input of its corresponding unit 132. While a unit 132 is being scanned, the negative potential on line 128 charges the capacitor 46 (FIGURE 1) of each of the four circuits 50 within the units. At the end of the character, line 128 and, accordingly, line 42 goes to ground causing a positive spike to be applied via switch 40 and diode 38 to the base of transistor 32 turning it off. In this manner, each unit 132 is reset immediately upon completion of its readout, and is, therefore, prepare to receive again condition information from the monitored points via input line 14.

Each AND gate 130 has four output lines. Each line is connected to one of the four OR gates 134, 136, 138, and 140. To maintain a systematic approach, the corresponding AND gate within each block 130 is connected to the same OR gate. For example, the Number 1 AND gate in each of the blocks 130 would be connected to OR gate 134. The output of each of the four OR gates is applied, respectively, to the second input of the group of AND gates 116 through 122.

The outputs of the eight AND gates 108 through 122 are connected in parallel to OR gate 124. The output signal from OR gate 124 during operation of the encoder is a train of telegraph characters in which a spacing condition is represented by a ground output and a marking condition is represented by a negative potential. These generated telegraph signals are the inverse of the normal telegraph character in which the marking condition is positive with respect to the spacing condition. Accordingly, an inverter 142 is applied to invert these telegraph characters into conventional form.

The output of inverter 142 is applied to a conventional telegraph start-stop regenerative repeater 144. This repeater is designed to sample each bit of a character at the 50% point; thus, if the bit is marking at the 50% point, a marking condition occurs in the output and if a spacing condition occurs at the 50% point, a spacing condition occurs in the output. The output of the regenerative repeater is a pulse train of sharply defined transitions with no distortion or mutilation.

The use of this regenerative repeater 144 also serves a unique function in that it eliminates the necssity of a storage register following the output of the units 132. The inputs arriving from the monitored points do not appear on a scheduled basis and, therefore, can arrive to trigger a circuit 50 while that circuit is being scanned. The output of the circuit 50 would, therefore, be going from one potential condition to another and the output telegraph character would contain for the corresponding information bit both marking and spacing conditions and very likely, mutilation of the entire bit. Usually, a storage register function is provided in the logic to guard against this result. However, here the regenerative repeater 144 samples at the 50% point and if the switching occurs prior to the 50% point the repeater 144 detects only the new condition. If the switching occurs after the 50% point, the repeater has already sampled that bit and is not affected. In both cases, the output of the regenerative repeater 144 for that bit would be uniform.

In the operation of the system shown in FIGURE 2 please assume that the eleventh stage of distributor 102 is energized and the eleventh output is at negative potential. The other ten outputs are at ground. The eleventh output signifies that the second element of the stop pulse is being generated. The output of OR gate 124 would be at a negative level signifying the mark condition.

The pulses from clock 100 are generated at a predetermined rate and the next pulse applied to distributor 102 drives stage 1 conducting and turns off stage eleven. Because stage 1 is not connected into the logic, the output of OR gate 124 goes to ground signifying the start pulse spacing condition.

Assume also that here the binary counter 104 has previously attained the binary count of fifteen. When distributor 102 switches from its eleventh stage to its first stage conducting, it generates a drive pulse which is transmitted on line 106 to advance counter 104. Counter 104 is returned to its zero count, placing the four output lines shown at ground potential and, accordingly, applying ground at the second input of each of the AND gates 108, 110, 112 and 114. Upon the return of counter 104 to the zero condition, the binary-to-decimal converter 126 removes the negative potential condition from line 128p and applies it to line 128a. Lines 128b through 128p are at ground potential. Circuits 50 within unit 132p are reset. The negative condition on line 128a is applied to one input of each of the AND gates in block 130a.

If no inputs have been applied by lines 14 to the four circuits 50 within the unit 132a since the end of the last scan of this unit 132a, all four output lines leading to AND gates 130a will be at negative potential. If an input signal has been applied to any of the circuits 50 within unit 132a, the output of any such circuit will be at ground and ground will be applied to the corresponding AND gate 130a. Assume here that from the points being monitored by unit 132a, only a signal condition has been applied to the leftmost circuit 50 and only its output line at position one is at ground potential. Thus, when line 128a goes negative, coincidence occurs at all AND gates 130a except the uppermost. Accordingly, the input to OR gate 134 is a ground condition while the input to OR gates 136, 138 and 140 is a negative potential. The second input of AND gate 116 will be at ground, while the second input of AND gates 118, 120, and 122 will be at negative potential.

The conducting period of all stages within distributor 102 are equal because the drive pulses from clock 100 are equally spaced in time. For example, if the eight-level telegraph characters are to be transmitted at the speed of 110 baud, then each of the eleven bits in the character will be of 9.09 millisecond duration. Therefore, a drive pulse from clock 100 will arrive every 9.09 milliseconds. If desirable, clock 100 can be made variable to vary the transmission speed of the characters.

The start pulse ends when the next drive pulse from clock 100 advances distributor 102 to its second stage conducting. A negative signal is applied to the first input of AND gate 108. Because the second input is at ground there is no coincidence and the output of this AND gate stays at ground. This signifies a binary zero. A ground condition is applied to the OR gate 124 whose output remains at ground indicating that the first information bit of the character being generated is a space. As distributor 102 continues its scan in response to successive arrivals of drive pulses from clock 100, the output of OR gate 124 remains spacing through the fifth stage because of the absence of coincidence at AND gates 110, 112 and 114. When the sixth stage of distributor 102 is actuated, a negative potential is applied to the first input of AND gate 116; however, the second input to this AND gate is at ground as determined by the signal condition at the first circuit 50 in unit 132a. Accordingly, no coincidence occurs at the AND gate 116 and the output signal from OR gate 124 remains spacing. When stage seven of distributor 102 is actuated, coincidence is realized at AND gate 118 and a negative output is applied to the input of OR gate 124. The output of this OR gate goes negative signifying a marking condition. Coincidence is also realized at AND gates 120 and 122 when stages eight and nine, respectively, of distributor 102 sequentially conduct. Negative outputs are applied from both of these last-named AND gates to OR gate 124 and the output of OR gate 124 remains negative or marking.

When the tenth stage of distributor 102 is actuated a negative signal is applied directly to OR gate 124 and a negative potential appears in the output. This signifies the first marking element or bit of the stop pulse. The eleventh stage is also directly connected to the OR gate 124 and when this stage conducts, output of this OR gate remains marking, signifying the second stop element of the generated character. As described previously, the output of OR gate 124 is inverted at 142 and regenerated at 144. The output of regenerator 144 consists for the encoding example just described as an eight-level telegraph character consisting of a mark-to-space transition signifying the beginning of the start pulse followed by a continuous spacing condition for six pulses or bits. A space-to-mark transition next occurs and this is followed by a continuous marking condition for five pulses or bits. This character is shown in line (a) of FIGURE 3.

The next pulse from clock 100 turns off stage eleven of distributor 102 and turns on stage one, thereby beginning a new scan. The output of OR gate 124 goes to ground signifying the start pulse of the next character. At the same time a drive pulse appears on line 106 advancing binary counter 104 to its next count. Output line one of counter 104 goes negative but the remaining three lines stay at ground. A negative potential is applied to the second input of AND gate 108. The binary-to-decimal converter 126 now causes line 128a to return to ground and line 128b to go negative. Line 42a connected to line 128a also goes to ground causing a reset pulse to be applied to all circuits 50 within unit 132a. Unit 132a is now ready to receive input signals from its monitored unit in preparation for the next scan of this unit.

Line 128b, by going negative, conditions the four AND gates in block 130b. Outputs from unit 132b form the second input to each of these AND gates. Assume here that since the last scan of unit 132b the two circuits 50 having outputs three and four have received signal conditions from the monitored points by the appropriate lines 14. The output lines three and four apply a ground potential condition and output lines one and two apply a negative potential to the AND gates 130b. AND gates one and two, only, are at coincidence and negative signals are applied to OR gates 134 and 136, respectively. The remaining two outputs from AND gates 130b are at ground potential. Negative potentials are applied by OR gates 134 and 136 to AND gates 116 and 118, respectively. OR gates 138 and 140 apply ground potentials to AND gates 120 and 122, respectively.

As distributor 102 steps through its remaining stages in response to the pulses from clock 100, the generated telegraph character will be encoded as follows. Following the start spacing condition, the telegraph character goes marking in response to coincidence at AND gate 108. The next three bits are spacing because of absence of coincidence at AND gates 110, 112, and 114. The sixth and seventh bits are marks because of coincidence at AND gates 116 and 118. The eighth and ninth bits are spaces reflecting the absence of coincidence at AND gates 120 and 122. The tenth and eleventh bits form the stop pulse and are marks because of the direct connection from the distributor 102 to OR gate 124. This character is illustrated in FIGURE 3(b).

Following the completion of its second scanning cycle, distributor 102 would begin its third scan and would generate a character whose mark and space patterns would depend upon the presence or absence of coincidence at each of the AND gates 108 through 122. This procedure continues until sixteen telegraph characters have been generated, which sixteenth character will contain the condition of all the circuits 50 within the unit 132p and, accordingly, the condition of the points being monitored by this unit. An example of a character indicating the condition of unit 132p is shown in FIGURE 3(c). Following the generation of the sixteenth character, the next pulse from clock 100 places the first stage of distributor 102 conducting and binary counter 104 is returned to its zero state by the pulse arriving on line 106. The entire generating cycle begins anew, starting with the generation of a telegraph character containing the information regarding the condition of unit 132a and, accordingly, the points being monitored by this unit.

The aforedescribed encoder permits transmission or telemetering of the condition of sixteen times four, or sixty-four points, including positional information of the monitored points. With an eight-level telegraph code, other combinations of information bits are possible. For example, for 128 conditions, the first six information bits would be binary coded information and the remaining two bits would contain the condition of the monitored points. The binary counter 104 would count to sixty-four and the converter 126 would have sixty-four output lines. There would be sixty-four units 132 each containing two circuits 50. The blocks 130 would contain only two AND gates. The first six AND gates 108 through 118 would be connected to the output of counter 104 and would provide the binary coded information, and the last two AND gates 120 and 122 would provide information on the condition of the monitored points. Sixty-four characters would be generated in sixty-four scanning cycles to transmit the condition of the sixty-four times two, or 128 monitored points. For transmitting information on twenty-four points with an eight-level code, the first two information bits would contain the positional information and the remaining six bits would contain the information regarding the monitored points. It is obvious, therefore, that other combinations are possible. If a five-level, six-level, or N-level code is used, other combinations can be devised to obtain the most information with the least amount of equipment.

When the telegraph characters are received, they are decoded. If desired, the received signals can be used to operate a tape punch and the eight-level code can be visually decoded. For automatic decoding, a decoder from the Datalok series of decoders made by Pulse Communications, Inc., of Alexandria, Virginia, may be used.

What is claimed is:

1. An encoding system comprising an oscillator, a distributor driven by said oscillator and having a plurality of outputs, a first series of coincidence gates divided into a first group and a second group, said coincidence gates being individually connected to a different output from said distributor so that said gates will be sampled in sequence as said distributor is driven by said oscillator, a binary counter having a plurality of outputs and connected to be advanced by said distributor during each sampling cycle, a converter circuit having a plurality of outputs, the outputs of said binary counter being connected to said first group of coincidence gates and to said converter circuit, a plurality of switching circuits, each circuit being designed to monitor the condition of a point and to reflect such condition by the potential condition at its output, a second series of coincidence gates for receiving the output of said plurality of circuits and the output of said converter, the output of said second series of coincidence gates being connected to said second group of coincidence gates, a common output circuit, means for connecting the outputs of said first series of coincidence gates to said common output circuit so that an output pulse train is generated as said distributor samples in sequence said first series of coincidence gates.

2. An encoding system as claimed in claim 1 further comprising means for injecting start and stop pulses into each generated pulse train thereby converting the pulse trains into a telegraph code format.

3. An encoding system as claimed in claim 2 further comprising a start-stop regenerative repeater connected to receive the output pulse train and to regenerate same in undistorted and unmutilated form.

4. An encoding system comprising a distributor, means for driving said distributor so that it sequentially emits a signal from each of a plurality of outputs, a series of coincidence gates coupled to said outputs, said series being divided into at least two groups, each of said gates being connected to a common output circuit so that an output pulse train is generated as said distributor samples said series of coincidence gates when said distributor is driven by said driving means, means for conditioning one of said groups of coincidence gates with input signals which will effect from that conditioned group binary-coded information in the output train when said one group of gates is sampled by said distributor, means for monitoring the condition of remote points and for conditioning another of said groups of gates with signals reflecting the condition at said remote points so that said output train contains coded information of such condition, separate from said binary-coded information, when said second group of coincidence gates is sampled by said distributor, the binary-coded information in said pulse train being indicative of the location of the monitored points whose condition is reflected by the separate coded information.

5. An encoding system as claimed in claim 4 further comprising means for injecting a start and stop pulse into said pulse train to convert said pulse train into a telegraph character.

6. An encoding system as claimed in claim 5 further comprising a start-stop regenerative repeater connected to receive said telegraph character and to regenerate same in undistorted and unmutilated form.

References Cited
UNITED STATES PATENTS

| | | | |
|---|---|---|---|
| 3,335,404 | 8/1967 | Wood | 340—348 XR |
| 3,369,219 | 2/1968 | Abramson et al. | 340—151 XR |

DONALD J. YUSKO, *Primary Examiner.*